(12) United States Patent
Ugur et al.

(10) Patent No.: US 10,397,618 B2
(45) Date of Patent: Aug. 27, 2019

(54) METHOD, AN APPARATUS AND A COMPUTER READABLE STORAGE MEDIUM FOR VIDEO STREAMING

(71) Applicant: Nokia Technologies Oy, Espoo (FI)

(72) Inventors: Kemal Ugur, Tampere (FI); Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/541,667

(22) PCT Filed: Dec. 21, 2015

(86) PCT No.: PCT/FI2015/050915
§ 371 (c)(1),
(2) Date: Jul. 5, 2017

(87) PCT Pub. No.: WO2016/113458
PCT Pub. Date: Jul. 21, 2016

(65) Prior Publication Data
US 2018/0007395 A1     Jan. 4, 2018

(30) Foreign Application Priority Data

Jan. 12, 2015     (GB) .................................. 1500400.5

(51) Int. Cl.
*H04N 21/218*     (2011.01)
*H04N 21/2343*     (2011.01)
(Continued)

(52) U.S. Cl.
CPC ... *H04N 21/21805* (2013.01); *H04N 21/2343* (2013.01); *H04N 21/23439* (2013.01);
(Continued)

(58) Field of Classification Search
CPC ....... H04N 21/21805; H04N 21/23439; H04N 21/47202; H04N 21/8456; H04N 21/8543
See application file for complete search history.

(56) References Cited

U.S. PATENT DOCUMENTS 7,289,506 B1   10/2007   Hannuksela
2010/0259595 A1   10/2010   Trimeche et al.
(Continued)

FOREIGN PATENT DOCUMENTS

CN     101312542 A     11/2008
CN     102892004 A     1/2013
(Continued)

OTHER PUBLICATIONS

Sodagar, "The MPEG-DASH Standard for Multimedia Streaming Over the Internet", IEEE MultiMedia, vol. 18, No. 1, Apr. 2011, pp. 62-67.
(Continued)

*Primary Examiner* — John R Schnurr
(74) *Attorney, Agent, or Firm* — Alston & Bird LLP

(57) ABSTRACT

A method comprising: requesting, by a client, an independently coded first representation of a video content component from a server; receiving and playing a first set of data units of the independently coded first representation; requesting a second set of data units of a second representation, said second set of data units being dependently coded on one or more requested or buffered data units of the first set; and requesting a third set of independently coded data units of a third representation.

24 Claims, 8 Drawing Sheets

(51) Int. Cl.
| | |
|---|---|
| H04N 21/472 | (2011.01) |
| H04N 21/845 | (2011.01) |
| H04N 21/8543 | (2011.01) |
| H04N 21/438 | (2011.01) |
| H04N 21/462 | (2011.01) |
| H04N 21/6587 | (2011.01) |

(52) U.S. Cl.
CPC ..... *H04N 21/4384* (2013.01); *H04N 21/4621* (2013.01); *H04N 21/47202* (2013.01); *H04N 21/6587* (2013.01); *H04N 21/8456* (2013.01); *H04N 21/8543* (2013.01)

(56) References Cited

U.S. PATENT DOCUMENTS

| | | | |
|---|---|---|---|
| 2012/0016965 | A1 | 1/2012 | Chen et al. |
| 2012/0070125 | A1 | 3/2012 | Lin et al. |
| 2012/0185570 | A1 | 7/2012 | Bouazizi et al. |
| 2013/0135431 | A1 | 5/2013 | Chen et al. |
| 2013/0235152 | A1 | 9/2013 | Hannuksela et al. |
| 2013/0329781 | A1* | 12/2013 | Su .................... H04N 21/23424 375/240.02 |
| 2013/0342646 | A1* | 12/2013 | Suh .................... H04N 21/2362 348/43 |
| 2014/0168362 | A1 | 6/2014 | Hannuksela et al. |
| 2014/0219346 | A1 | 8/2014 | Ugur et al. |

FOREIGN PATENT DOCUMENTS

| | | |
|---|---|---|
| CN | 103856778 A | 6/2014 |
| CN | 104115494 A | 10/2014 |
| WO | 2013/093176 A1 | 6/2013 |

OTHER PUBLICATIONS

Fielding et al., "Hypertext Transfer Protocol—HTTP/1.1", RFC 2616, Network Working Group, Jun. 1999, pp. 1-152.
Farber et al., "Adaptive Progressive Download Based on the MPEG-4 File Format" Journal of Zhejiang University—Science A, vol. 7, 2006, pp. 106-111.
Zambelli, "IIS Smooth Streaming Technical Overview", Microsoft Corporation, 2009, pp. 1-17.
Pantos et al., "HTTP Live Streaming", draft-pantos-http-live-streaming-09, Apple Inc. Sep. 22, 2012, pp. 1-32.
"HTTP Dynamic Streaming on the Adobe Flash Platform", Adobe Flash Platform Technical White Paper, 2010, 18 Pages.
"3rd Generation Partnership Project; Technical Specification Group Services and System Aspects;Transparent end-to-end Packet-switched Streaming Service (PSS); Protocols and codecs (Release 9)", 3GPP TS 26.234, V9.10.0, Jun. 2013, pp. 1-189.
"3rd Generation Partnership Project; Technical Specification Group Services and System Aspects;Transparent end-to-end Packet-switched Streaming Service (PSS); Progressive Download and Dynamic Adaptive Streaming over HTTP (3GP-DASH) (Release 10)", 3GPP TS 26.247, V10.7.0, Mar. 2014, pp. 1-113.
"Dynamic adaptive streaming over HTTP (DASH)—Part 1: Media presentation description and segment formats", Draft International Standard, ISO/IEC 23009-1, Aug. 30, 2011.
Wenger et al., "RTP Payload Format for H.264 Video", RFC 3984, Network Working Group, Feb. 2005, pp. 1-72.
Miao et al., "Optimal Scheduling for Streaming of Scalable Media", Conference Record of the Thirty-Fourth Asilomar Conference on Signals, Systems and Computers, vol. 2, 2000, pp. 1357-1362.
Miao et al., "Expected Run-Time Distortion Based Scheduling for Delivery of Scalable Media", Proceedings of the International Packet, 2002, pp. 1-11.
Kang et al., "Packet Scheduling Algorithm for Wireless Video Streaming", Proceedings of the International Packet Video, 2002, pp. 1-11.

Kang et al., "Effective Bandwidth Based Scheduling for Streaming Media", IEEE Transactions on Multimedia, vol. 7, No. 6, Dec. 2005, pp. 1139-1148.
Chou et al., "Rate-Distortion Optimized Streaming of Packetized Media", Technical Report MSR-TR-2001-35, 2001, pp. 1-44.
Chou et al., "Rate-Distortion Optimized Streaming of Packetized Media", IEEE Transactions on Multimedia, vol. 8, No. 2, 2006, pp. 390.404.
Kalman et al., "Rate-Distortion Optimized Video Streaming With Multiple Deadlines", Proceedings of International Conference on Image Processing, vol. 2, 2003, pp. 661-664.
Chakareski et al., "Rate-Distortion Optimized Packet Scheduling and Routing for Media Streaming With Path Diversity", Proceedings of Data Compression Conference, 2003, 10 pages.
Setton et al., "Congestion-Distortion Optimized Scheduling of Video over a Bottleneck Link", IEEE 6th Workshop on Multimedia Signal Processing, 2004, pp. 179-182.
Schierl et al., "H.264/AVC Interleaving for 3G Wireless Video Streaming", IEEE International Conference on Multimedia and Expo, Jul. 6, 2005, 4 pages.
Schierl et al., "3GPP Compliant Adaptive Wireless Video Streaming Using H.264/AVC", IEEE International Conference on Image Processing, vol. 3, Sep. 14, 2005, pp. 696-699.
Kampmann et al., "Adaptive Wireless Video Streaming Using Transmission Rate Control and Priority-Based Packet Scheduling", Proceedings of the International Packet Video Workshop, Dec. 2004.
Hellge et al., "CDNs with DASH and iDASH using Priority Caching", Proceedings of Pacific-Rim Conference on Multimedia, Dec. 2011, pp. 521-530.
Schierl et al., "Priority-Based Media Delivery Using SVC with RTP and HTTP Streaming", Multimedia Tools and Applications, vol. 55, No. 2, Nov. 2011, pp. 227-246.
Kurutepe et al., "Client-Driven Selective Streaming of Multiview Video for Interactive 3DTV", IEEE Transactions on Circuits and Systems for Video Technology, vol. 17, No. 11, Nov. 2007, pp. 1558-1565.
Zhu et al., "Inter-View-Predicted Redundant Pictures for Viewpoint Switching in Multiview Video Streaming", IEEE International Conference on Acoustics, Speech and Signal Processing, Mar. 14-19, 2010, pp. 746-749.
U.S. Appl. No. 61/242,214, "Method And Apparatus for Coding And Storage Of Redundant Pictures In Multi-View Video", filed on Sep. 14, 2009, 32 pages.
U.S. Appl. No. 62/017,072, "An Apparatus, a Method and a Computer Program for Video Coding and Decoding", filed on Jun. 25, 2014, 88 pages.
U.S. Appl. No. 61/844,014, "Method and Apparatus for Video Coding", filed on Jul. 9, 2013, 113 pages.
Schulzrinne et al., "A Transport Protocol for Real-Time Applications", RFC 3550, Network Working Group, Jul. 2003, pp. 1-90.
"Information Technology—Generic Coding of Moving Pictures and Associated Audio Information: Systems", ISO/IEC 13818-1, Second edition, Dec. 1, 2000, 174 pages.
"Information Technology—Coding of Audio-Visual Objects—Part 12: ISO Base Media File Format", ISO/IEC 14496-12, Third edition, Oct. 15, 2008, 120 pages.
"Information Technology—Coding of Audio-Visual Objects—Part 14: MP4 File Format", ISO/IEC 14496-14, First edition, Nov. 15, 2003, 18 pages.
"Information Technology—Coding of Audio-Visual Objects—Part 15: Advanced Video Coding (AVC) file format", ISO/IEC 14496-15, First edition, Apr. 15, 2004, 29 pages.
"3rd Generation Partnership Project; Technical Specification Group Services and System Aspects; Transparent end-to-end packet switched streaming service (PSS); 3GPP file format (3GP) (Release 13)", 3GPP TS 26.244, V13.0.0, Dec. 2014, pp. 1-64.
"Parameter Values for Ultra-High Definition Television Systems for Production and International Programme Exchange", Recommendation ITU-R BT.2020, Aug. 2012, 7 pages.
"Parameter Values for the HDTV Standards for Production and International Programme Exchange", Recommendation ITU-R BT.709, Apr. 2002, 32 pages.

(56) References Cited

OTHER PUBLICATIONS

Moats., "URN Syntax", RFC 2141, Network Working Group, May 1997, pp. 1-7.

Lee et al., "Uniform Resource Identifier (URI): Generic Syntax", RFC 3986, Network Working Group, Jan. 2005, pp. 1-53.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual and Multimedia Systems, Infrastructure of audiovisual services—Coding of moving Video, Recommendation ITU-T H.264, Feb. 2014, 790 pages.

"High Efficiency Video Coding", Series H: Audiovisual and Multimedia Systems, Infrastructure of audiovisual service—Coding of moving video, Recommendation ITU-T H.265, Oct. 2014, 540 pages.

"Information technology—MPEG video technologies—Part 3:Representation of auxiliary video and supplemental information", ISO/IEC 23002-3, Oct. 15, 2007.

Search Report received for corresponding United Kingdom Patent Application No. 1500400.5, dated Jul. 13, 2015, 4 pages.

International Search Report and Written Opinion received for corresponding Patent Cooperation Treaty Application No. PCT/FI2015/050915, dated Apr. 5, 2016, 15 pages.

Xiu et al., "Delay-Cognizant Interactive Streaming of Multiview Video with Free Viewpoint Synthesis", IEEE Transactions on Multimedia, vol. 14, No. 4, Aug. 2012, pp. 1109-1126.

Extended European Search Report for European Application No. 15877707.8 dated Jul. 18, 2018.

Yanwei, L. et al., "Low-delay View Random Access for Muiti-view Video Coding", Circuits and Systems, 2007. ISCAS 2007. IEEE International Symposium, IEEE, PI, dated May 1, 2007, pp. 997-1000.

Office Action for Chinese Application No. 201580073022.3 dated Jun. 17, 2019, 9 pages.

* cited by examiner

METHOD, AN APPARATUS AND A COMPUTER READABLE STORAGE MEDIUM FOR VIDEO STREAMING

RELATED APPLICATION

This application was originally filed as Patent Cooperation Treaty Application No. PCT/FI2015/050915 filed Dec. 21, 2015 which claims priority benefit to Great Britain Patent Application No. 1500400.5, filed Jan. 12, 2015.

TECHNICAL FIELD

The present invention relates to an apparatus, a method and a computer program for video coding and decoding.

BACKGROUND

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. DASH has turned out to be a promising protocol for multimedia streaming applications, especially for multiview coded video bistreams. However, streaming clients typically maintain a relatively large buffer occupancy level in order to avoid playback interruptions due to throughput fluctuations. For viewpoint switching in MVC bitstreams this means that an excessive amount of views is transmitted to the client to enable immediate viewpoint switching.

An atomic unit in streaming ISOBMFF segments over DASH is a self-contained movie fragment, which is typically relatively large. DASH clients typically receive at least one entire self-contained movie fragment before processing it, hence a buffer occupancy level in DASH clients is typically at least one movie fragment.

For example, the quality of experience of free-viewpoint streaming applications may deteriorate significantly if the reaction to viewpoint switch requests is slow. This may be particularly true, when viewpoint switching takes place as response to head and/or gaze tracking.

Consequently, there is a need for a method for performing low-latency viewpoint switching when views are obtained using DASH, but at the same time keep the bitrate of the transmitted video as low as possible and the decoding complexity, in terms of computational and memory requirements, as low as possible.

SUMMARY

Now in order to at least alleviate the above problems, a method for initiating a viewpoint switch is introduced herein.

A method according to a first aspect comprises
requesting, by a client, an independently coded first representation of a video content component from a server;
receiving and playing a first set of data units of the independently coded first representation;
requesting a second set of data units of a second representation, said second set of data units being dependently coded on one or more requested or buffered data units of the first set; and
requesting a third set of independently coded data units of a third representation.

According to an embodiment, the first set of data units comprises segments or sub-segments of a first view of a multiview coded bitstream, and the second and the third sets of data units comprise segments or sub-segments of a second view of the multiview coded bitstream.

According to an embodiment, the method further comprises:
determining a first segment or sub-segment of the second set of data units such that it corresponds to a segment or a sub-segment of the first set of data units already downloaded or estimated to be downloaded by the time said first segment or sub-segment of the second set of data units is received.

According to an embodiment, the method further comprises:
determining the first segment or sub-segment of the second set of data units such that it corresponds to an intra random access point (IRAP) picture in the second set of data units.

According to an embodiment, the method further comprises:
requesting the segments or sub-segments of the third representation following, in playout time, the segments or sub-segments of the second set of data units.

According to an embodiment, the method further comprises:
continuing to request the segments or sub-segments of the first and the second representations.

According to an embodiment, the method further comprises:
requesting said second set of data units as an inter-view predicted view predicted from said first set of data units.

According to an embodiment, the method further comprises:
requesting said second set of data units as a depth view for said first set of data units; and
applying depth-image-based rendering (DIBR) or forward view synthesis for generating the second representation.

According to an embodiment, the first representation comprises a lower-bitrate single-layer stream of the video content component, the second representation comprises an enhancement scalability layer for the lower-bitrate stream of the video content component and the third representation comprises a higher-bitrate single-layer stream of the video content component.

According to an embodiment, the method further comprises:
requesting said second set of data units of the second representation as a response to receiving a user request or the client determining to switch to a higher resolution representation of the video content component.

A second aspect relates to an apparatus comprising
at least one processor and at least one memory, said at least one memory stored with code thereon, which when executed by said at least one processor, causes the apparatus to perform at least
requesting an independently coded first representation of a video content component from a server;
receiving and playing a first set of data units of the independently coded first representation;

requesting a second set of data units of a second representation, said second set of data units being dependently coded on one or more requested or buffered data units of the first set; and requesting a third set of independently coded data units of a third representation.

A third aspect involves a computer readable storage medium with code thereon for use by an apparatus, which when executed by a processor, causes the apparatus to perform:

requesting an independently coded first representation of a video content component from a server;

receiving and playing a first set of data units of the independently coded first representation;

requesting a second set of data units of a second representation, said second set of data units being dependently coded on one or more requested or buffered data units of the first set; and requesting a third set of independently coded data units of a third representation.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
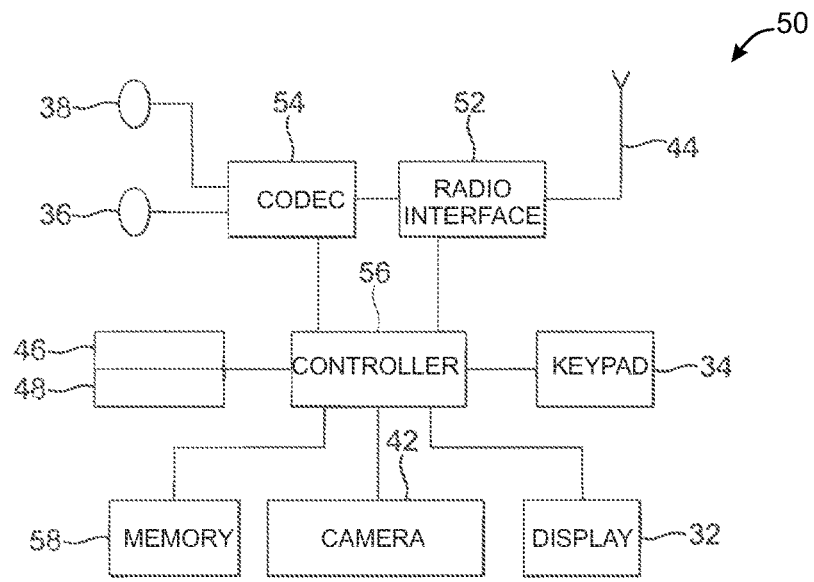
FIG. 1 shows schematically an electronic device employing embodiments of the invention.
Figure 2:
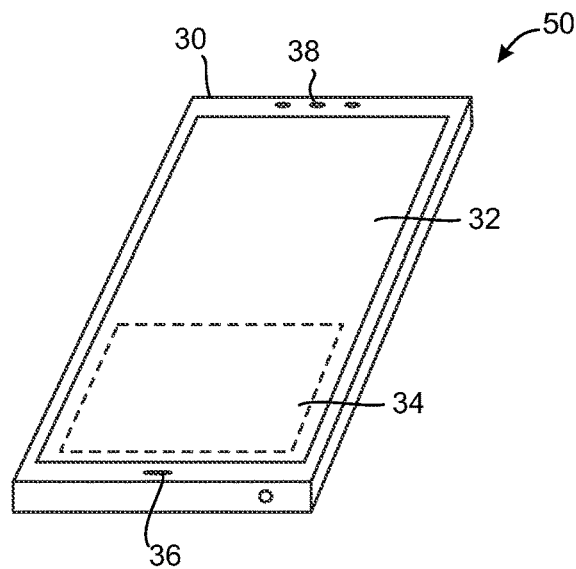
FIG. 2 shows schematically a user equipment suitable for employing embodiments of the invention.

The following describes in further detail suitable apparatus and possible mechanisms for initiating a viewpoint switch. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
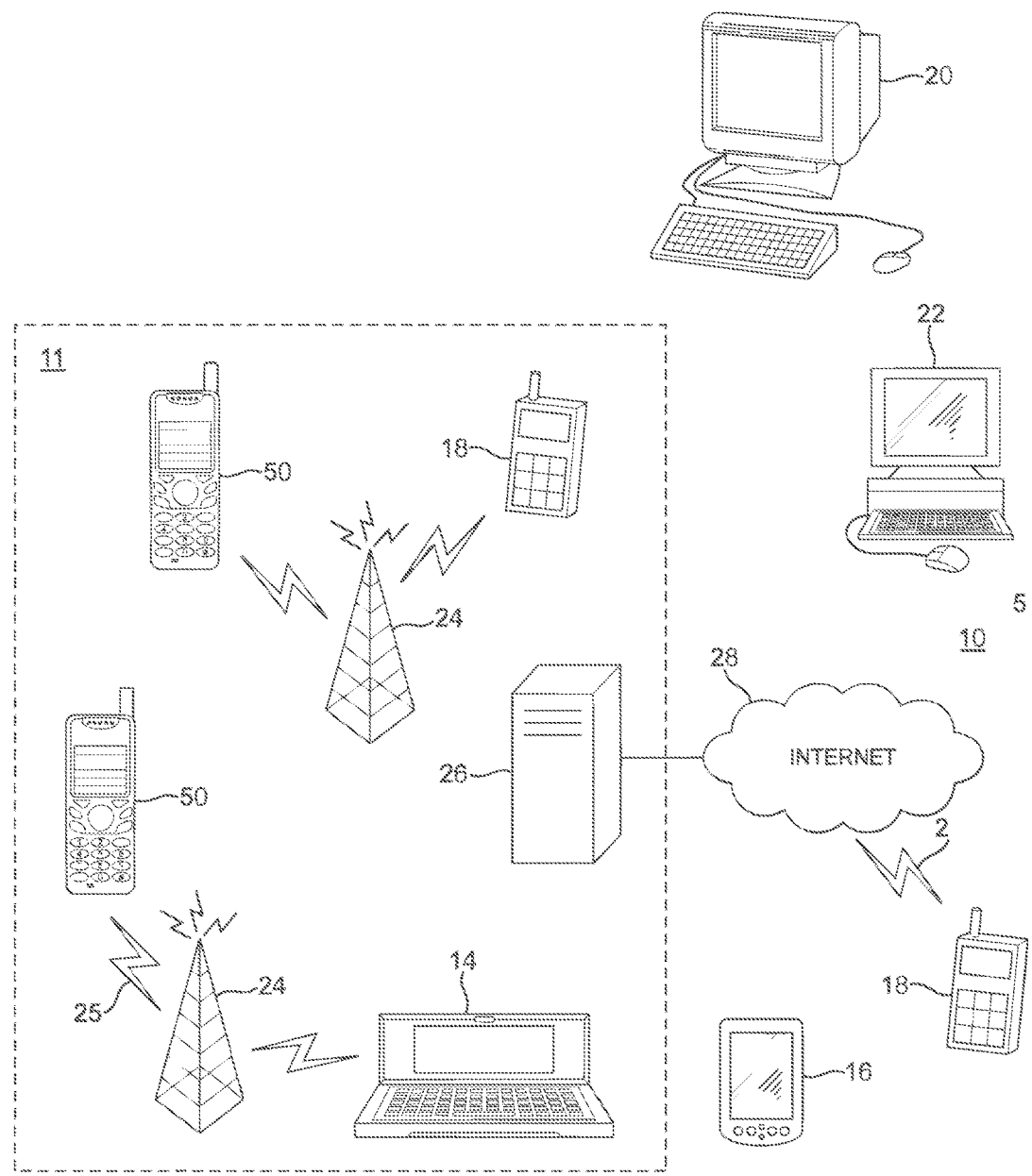
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session. An RTP stream may be regarded as a logical channel.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format). A track may be regarded as a logical channel.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., temporal_id of SVC or MVC or TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction shall be assigned to levels. The Level Assignment box provides a mapping from features, such as scalability layers, to levels. A feature can be specified through a track, a sub-track within a track, or a sample grouping of a track. The Level Assignment box includes the syntax element padding_flag. padding_flag is equal to 1 indicates that a conforming fraction can be formed by concatenating any positive integer number of levels within a fraction and padding the last Media Data box by zero bytes up to the full size that is indicated in the header of the last Media Data box. For example, padding_flag can be set equal to 1 when each fraction contains two or more AVC, SVC, or MVC tracks of the same video bitstream, the samples for each track of a fraction are contiguous and in decoding order in a Media Data box, and the samples of the first AVC, SVC, or MVC level contain extractor NAL units for including the video coding NAL units from the other levels of the same fraction.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
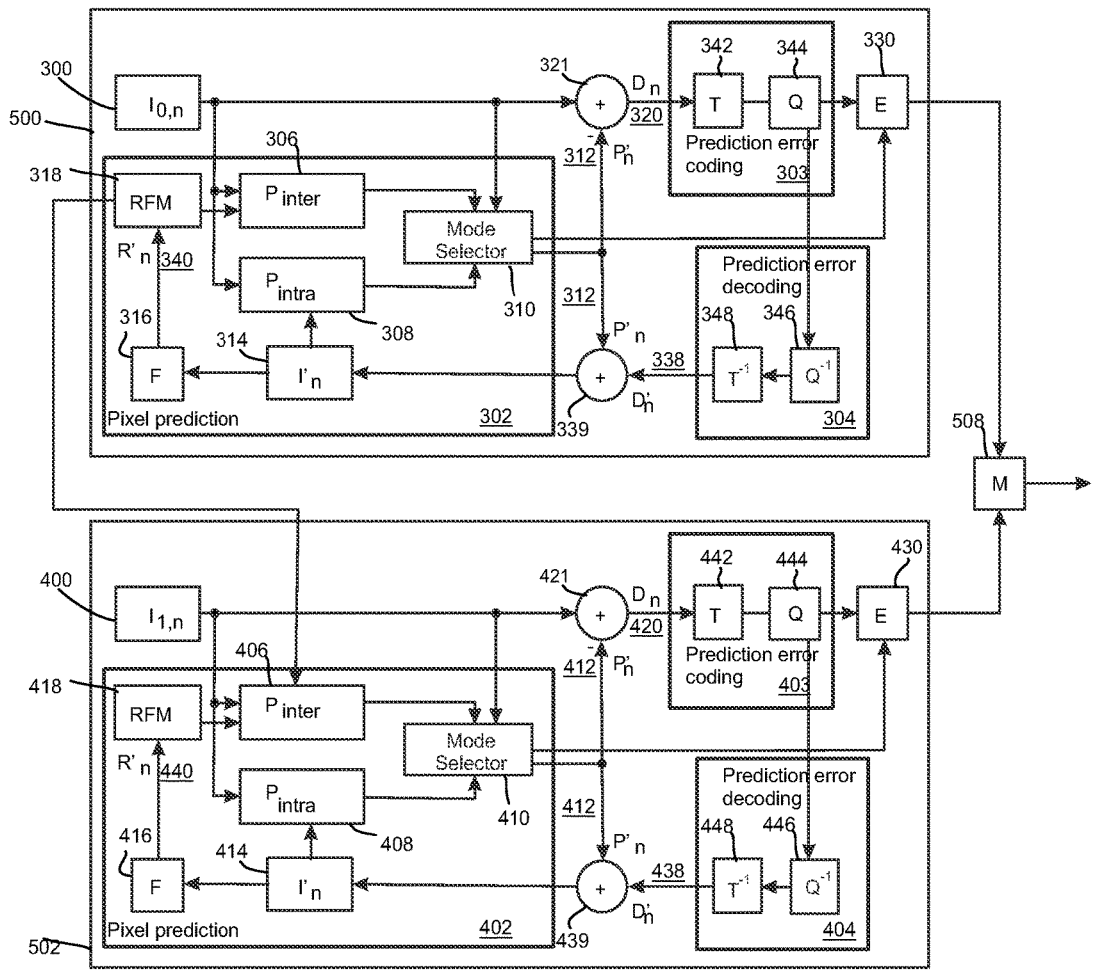
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was pre-published as ITU-T Recommendation H.265 (October 2014) and is likely to be published as Edition 2 of ISO/IEC 23008-2 in 2015. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy. In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, VCLNAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP (a.k.a. IDR_W_RADL) BLA_N_LP | Coded slice segment of a BLA picture slice_segment_layer_rbsp( ) |
| 19, 20 | IDR_W_DLP (a.k.a. IDR_W_RADL) IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved // reserved RAP VCL NAL unit types |
| 24 . . . 31 | RSV_VCL24 . . . RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A IRAP picture in an independent layer contains only intra-coded slices. An IRAP picture belonging to a predicted layer with nuh_layer_id value currLayerId may contain P, B, and I slices, cannot use inter prediction from other pictures with nuh_layer_id equal to currLayerId, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer with nuh_layer_id value currLayerId and all subsequent non-RASL pictures with nuh_layer_id equal to currLayerId in decoding order can be correctly decoded without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId). There may be pictures in a bitstream that contain only intra-coded slices that are not IRAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( ) syntax structure. The vps_extension( ) syntax structure was specified in HEVC version 2 primarily for multi-layer extensions and comprises syntax elements which may be of use for decoding of one or more non-base layers, such as syntax elements indicating layer dependency relations.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

Said specified classification rule may be specified for example as follows. The first access unit in the bitstream starts with the first NAL unit of the bitstream. A VCL NAL unit is the first VCL NAL unit of an access unit, when all of the following conditions are true:

The slice contained in the VCL NAL units is the first slice of a coded picture, which in HEVC is equivalent to the condition that first_slice_segment_in_pic_flag is equal to 1.

The previous coded picture in decoding order belongs to a difference access unit, which in HEVC multi-layer extensions correspond to at least one of the following conditions being true:

The previous picture in decoding order belongs to a different POC resetting period than the picture containing the VCL NAL unit.

PicOrderCntVal derived for the VCL NAL unit differs from the

PicOrderCntVal of the previous picture in decoding order.

The first of the NAL units that are allowed, by NAL unit specifications, to appear in the access unit before the first VCL NAL unit firstVclNalUnitInAu of the access unit in decoding order and that follows the last VCL NAL unit of the preceding access unit, in decoding order, starts the access unit. In HEVC, the first of any of the following NAL units preceding the first VCL NAL unit firstVclNalUnitInAu and succeeding the last VCL NAL unit preceding firstVclNalUnitInAu, if any, specifies the start of a new access unit:

Access unit delimiter NAL unit (when present).
VPS NAL unit (when present)
SPS NAL unit (when present)
PPS NAL unit (when present)
Prefix SEI NAL unit (when present)
NAL units with nal_unit_type in the range of RSV_N-VCL41 . . . RSV_NVCL44 (when present)
NAL units with nal_unit_type in the range of UNSPEC-48 . . . UNSPEC55 (when present)

When there is none of the above NAL units preceding firstVclNalUnitInAu and succeeding the last VCL NAL unit preceding firstVclNalUnitInAu, if any, firstVclNalUnitInAu starts a new access unit.

It may be required that coded pictures appear in certain order within an access unit. For example a coded picture with nuh_layer_id equal to nuhLayerIdA may be required to precede, in decoding order, all coded pictures with nuh_layer_id greater than nuhLayerIdA in the same access unit.

It may be required that the order of the coded pictures and non-VCL NAL units within an access unit obeys certain constraint such as the following specified for HEVC multi-layer extensions:

When an access unit delimiter NAL unit is present, it shall be the first NAL unit. There shall be at most one access unit delimiter NAL unit in any access unit.

When any VPS NAL units, SPS NAL units, PPS NAL units, prefix SEI NAL units, NAL units with nal_unit_type in the range of RSV_NVCL41 . . . RSV_NVCL44, or NAL units with nal_unit_type in the range of UNSPEC48 . . . UNSPEC55 are present, they shall not follow the last VCL NAL unit of the access unit.

NAL units having nal_unit_type equal to FD_NUT or SUFFIX_SEI_NUT, or in the range of RSV_NVCL-45 . . . RSV_NVCL47 or UNSPEC56 . . . UNSPEC63 shall not precede the first VCL NAL unit of the access unit.

When an end of sequence NAL unit with nuh_layer_id nuhLayerId is present, it shall be the last NAL unit with nuh_layer_id equal to nuhLayerId in the access unit other than an end of bitstream NAL unit (when present).

When an end of bitstream NAL unit is present, it shall be the last NAL unit in the access unit.

In HEVC, a picture unit may be defined as a set of NAL units that contain all VCL NAL units of a coded picture and their associated non-VCL NAL units. An associated VCL NAL unit for a non-VCL NAL unit may be defined as the preceding VCL NAL unit, in decoding order, of the non-VCL NAL unit for certain types of non-VCL NAL units and the next VCL NAL unit, in decoding order, of the non-VCL NAL unit for other types of non-VCL NAL units. An associated non-VCL NAL unit for a VCL NAL unit may be defined to be the a non-VCL NAL unit for which the VCL NAL unit is the associated VCL NAL unit. For example, in HEVC, an associated VCL NAL unit may be defined as the preceding VCL NAL unit in decoding order for a non-VCL NAL unit with nal_unit_type equal to EOS_NUT, EOB_NUT, FD_NUT, or SUFFIX_SEI_NUT, or in the ranges of RSV_NVCL45 . . . RSV_NVCL47 or UNSPEC56 . . . UNSPEC63; or otherwise the next VCL NAL unit in decoding order.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal to HandleCraAsBlaFlag. NoRaslOutputFlag equal to 1 has an impact that the RASL pictures associated with the IRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

In HEVC, a coded video sequence group (CVSG) may be defined, for example, as one or more consecutive CVSs in decoding order that collectively consist of an IRAP access unit that activates a VPS RBSP firstVpsRbsp that was not already active followed by all subsequent access units, in decoding order, for which firstVpsRbsp is the active VPS RBSP up to the end of the bitstream or up to but excluding the access unit that activates a different VPS RBSP than firstVpsRbsp, whichever is earlier in decoding order.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

SHVC enables the use of weighted prediction or a color-mapping process based on a 3D lookup table (LUT) for color gamut scalability. The 3D LUT approach may be described as follows. The sample value range of each color components may be first split into two ranges, forming up to 2×2×2 octants, and then the luma ranges can be further split up to four parts, resulting into up to 8×2×2 octants. Within each octant, a cross color component linear model is applied to perform color mapping. For each octant, four vertices are encoded into and/or decoded from the bitstream to represent a linear model within the octant. The color-mapping table is encoded into and/or decoded from the bitstream separately for each color component. Color mapping may be considered to involve three steps: First, the octant to which a given reference-layer sample triplet (Y, Cb, Cr) belongs is determined. Second, the sample locations of luma and chroma may be aligned through applying a color component adjustment process. Third, the linear mapping specified for the determined octant is applied. The mapping may have cross-component nature, i.e. an input value of one color component may affect the mapped value of another color component. Additionally, if inter-layer resampling is also required, the input to the resampling process is the picture that has been color-mapped. The color-mapping may (but needs not to) map samples of a first bit-depth to samples of another bit-depth.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostrereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A layer-wise start-up mechanism may generate unavailable pictures for the reference pictures of the first picture in decoding order in a particular enhancement layer. Alternatively, a decoder may omit the decoding of pictures preceding, in decoding order, the IRAP picture from which the decoding of a layer can be started. These pictures that may be omitted may be specifically labeled by the encoder or another entity within the bitstream. For example, one or more specific NAL unit types may be used for them. These pictures, regardless of whether they are specifically marked with a NAL unit type or inferred e.g. by the decoder, may be referred to as cross-layer random access skip (CL-RAS) pictures. The decoder may omit the output of the generated unavailable pictures and the decoded CL-RAS pictures.

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

A depth view refers to a view that represents distance information of a texture sample from the camera sensor, disparity or parallax information between a texture sample and a respective texture sample in another view, or similar information. A depth view may comprise depth pictures (a.k.a. depth maps) having one component, similar to the luma component of texture views. In some cases, chroma components or sample arrays may also be present, although decoded chroma sample arrays may be required to have a certain sample value and decoding of the chroma sample arrays may be ignored. A depth map is an image with per-pixel depth information, disparity of respectively pixels in two views, or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis.

Depth-enhanced video refers to texture video having one or more views associated with depth video having one or more depth views. A number of approaches may be used for representing of depth-enhanced video, including the use of video plus depth (V+D), and multiview video plus depth (MVD). In the video plus depth (V+D) representation, a single view of texture and the respective view of depth are represented as sequences of texture picture and depth pictures, respectively. The MVD representation contains a number of texture views and respective depth views. The depth information may be used in so-called depth-image-based rendering to synthesize texture views at viewpoints not represented by any of the coded texture views.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit. A texture view component may also be called a texture picture or a picture of a texture view or layer, and a depth view component may also be called a depth picture or a picture of a depth view or layer.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form of a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

Depth-enhanced video formats enable generation of virtual views or pictures at camera positions that are not represented by any of the coded views. Generally, any depth-image-based rendering (DIBR) algorithm may be used for synthesizing views.

The input of a 3D video codec may comprise for example a stereoscopic video and corresponding depth information with stereoscopic baseline b0. Then the 3D video codec synthesizes a number of virtual views between two input views with baseline (bi<b0). DIBR algorithms may also enable extrapolation of views that are outside the two input views and not in between them. Similarly, DIBR algorithms may enable view synthesis from a single view of texture and the respective depth view. However, in order to enable DIBR-based multiview rendering, texture data should be available at the decoder side along with the corresponding depth data.

In such 3DV system, depth information is produced at the encoder side in a form of depth pictures (also known as depth maps) for texture views.

Depth information can be obtained by various means. For example, depth of the 3D scene may be computed from the disparity registered by capturing cameras or color image sensors. A depth estimation approach, which may also be referred to as stereo matching, takes a stereoscopic view as an input and computes local disparities between the two offset images of the view. Since the two input views represent different viewpoints or perspectives, the parallax creates a disparity between the relative positions of scene points on the imaging planes depending on the distance of the points. A target of stereo matching is to extract those disparities by finding or detecting the corresponding points between the images. Several approaches for stereo matching exist. For example, in a block or template matching approach each image is processed pixel by pixel in overlapping blocks, and for each block of pixels a horizontally localized search for a matching block in the offset image is performed. Once a pixel-wise disparity is computed, the corresponding depth value z can be calculated e.g. by equation (1):

$$z = \frac{f \cdot b}{d + \Delta d}, \tag{1}$$

where f is the focal length of the camera and b is the baseline distance between cameras. Further, d may be considered to refer to the disparity observed between the two cameras or the disparity estimated between corresponding pixels in the two cameras. The camera offset $\Delta d$ may be considered to reflect a possible horizontal misplacement of the optical centers of the two cameras or a possible horizontal cropping in the camera frames due to pre-processing. However, since the algorithm is based on block matching, the quality of a depth-through-disparity estimation is content dependent and very often not accurate. For example, no straightforward solution for depth estimation is possible for image fragments that are featuring very smooth areas with no textures or large level of noise.

Alternatively or in addition to the above-described stereo view depth estimation, the depth value may be obtained using the time-of-flight (TOF) principle for example by using a camera which may be provided with a light source, for example an infrared emitter, for illuminating the scene. Such an illuminator may be arranged to produce an intensity modulated electromagnetic emission for a frequency between e.g. 10-100 MHz, which may require LEDs or laser diodes to be used. Infrared light may be used to make the illumination unobtrusive. The light reflected from objects in the scene is detected by an image sensor, which may be modulated synchronously at the same frequency as the illuminator. The image sensor may be provided with optics; a lens gathering the reflected light and an optical bandpass filter for passing only the light with the same wavelength as the illuminator, thus helping to suppress background light. The image sensor may measure for each pixel the time the light has taken to travel from the illuminator to the object and back. The distance to the object may be represented as a phase shift in the illumination modulation, which can be determined from the sampled data simultaneously for each pixel in the scene.

Alternatively or in addition to the above-described stereo view depth estimation and/or TOF-principle depth sensing, depth values may be obtained using a structured light approach which may operate for example approximately as follows. A light emitter, such as an infrared laser emitter or an infrared LED emitter, may emit light that may have a certain direction in a 3D space (e.g. follow a raster-scan or a pseudo-random scanning order) and/or position within an array of light emitters as well as a certain pattern, e.g. a certain wavelength and/or amplitude pattern. The emitted light is reflected back from objects and may be captured using a sensor, such as an infrared image sensor. The image/signals obtained by the sensor may be processed in relation to the direction of the emitted light as well as the pattern of the emitted light to detect a correspondence between the received signal and the direction/position of the emitted lighted as well as the pattern of the emitted light for example using a triangulation principle. From this correspondence a distance and a position of a pixel may be concluded.

It is to be understood that the above-described depth estimation and sensing methods are provided as non-limiting examples and embodiments may be realized with the described or any other depth estimation and sensing methods and apparatuses.

Disparity or parallax maps, such as parallax maps specified in ISO/IEC International Standard 23002-3, may be processed similarly to depth maps. Depth and disparity have a straightforward correspondence and they can be computed from each other through mathematical equation.

Texture views and depth views may be coded into a single bitstream where some of the texture views may be compatible with one or more video standards such as H.264/AVC and/or MVC. In other words, a decoder may be able to decode some of the texture views of such a bitstream and can omit the remaining texture views and depth views.

An amendment has been specified for the H.264/AVC for depth map coding. The amendment is called MVC extension for inclusion of depth maps and may be referred to as MVC+D. The MVC+D amendment specifies the encapsulation of texture views and depth views into the same bitstream in a manner that the texture views remain compatible with H.264/AVC and MVC so that an MVC decoder is able to decode all texture views of an MVC+D bitstream and an H.264/AVC decoder is able to decode the base texture view of an MVC+D bitstream. Furthermore, the VCL NAL units of the depth view use identical syntax, semantics, and decoding process to those of texture views below the NAL unit header.

Another amendment has been specified for the H.264/AVC for enhanced texture and depth map coding, which may be referred to as 3D-AVC. The 3D-AVC amendment comprises specific 3D video coding tools, such as view synthesis prediction. Encoders may choose to encode non-base depth views in a way conforming to MVC+D or to 3D-AVC. Likewise, encoders may choose to encode non-base texture views in a way conforming to MVC (and hence also to MVC+D) or to 3D-AVC.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

A depth-enhanced multiview video bitstream, such as an MVC+D bitstream, may contain two types of operation points: multiview video operation points (e.g. MVC operation points for MVC+D bitstreams) and depth-enhanced operation points. Multiview video operation points consist of texture view components only.

In the case of joint coding of texture and depth for depth-enhanced video, view synthesis or alike can be utilized in the loop of the codec, thus providing view synthesis prediction (VSP). In VSP, a prediction signal, such as a VSP reference picture, is formed using a DIBR or view synthesis algorithm, utilizing texture and depth information. For example, a synthesized picture (i.e., VSP reference picture) may be introduced in the reference picture list in a similar way as it is done with inter-view reference pictures in MVC and MV-HEVC. Alternatively or in addition, a specific VSP prediction mode for certain prediction blocks may be determined by the encoder, indicated in the bitstream by the encoder, and used as concluded from the bitstream by the decoder. Below some examples of VSP are provided. As a part of the described VSP examples, a prediction signal is formed, which part may also be considered as an example of a DIBR or view synthesis algorithm.

In MVC and MV-HEVC, both inter prediction and inter-view prediction use similar motion-compensated prediction process. Inter-view reference pictures are essentially treated as long-term reference pictures in the different prediction processes. Similarly, view synthesis prediction may be realized in such a manner that it uses essentially the same motion-compensated prediction process as inter prediction and inter-view prediction. The motion vector applied in the view synthesis prediction may be derived partly or fully based on the depth information available in an MVD bitstream. For example, the depth information may be obtained from a depth block collocating with the current texture block being coded or decoded, where the depth block belongs to a depth view that represents the same viewpoint as the texture view containing the current block texture block. In another example, the depth information may be refined on the basis of an initial inter-view motion vector (which may be obtained e.g. based on the inter-view motion vectors of spatially or temporally neighboring blocks) from which a depth block in the depth base view is located. The depth information may be subsampled from the depth samples of a depth block, e.g. a maximum value of the values of the corners of the depth block may be selected, and/or the depth information may be obtained through other processed of the depth samples of the depth block.

To enable view synthesis prediction for the coding of the current texture view component, the previously coded texture and depth view components of the same access unit may be used for the view synthesis. Such a view synthesis that uses the previously coded texture and depth view components of the same access unit may be referred to as a forward view synthesis or forward-projected view synthesis, and similarly view synthesis prediction using such view synthesis may be referred to as forward view synthesis prediction or forward-projected view synthesis prediction.

Forward View Synthesis Prediction (VSP) may be performed as follows. View synthesis may be implemented through depth map (d) to disparity (D) conversion with following mapping pixels of source picture s(x,y) in a new pixel location in synthesized target image t(x+D,y).

$$t(\lfloor x+D \rfloor, y) = s(x, y), \qquad (2)$$

$$D(s(x, y)) = \frac{f \cdot l}{z}$$

$$z = \left( \frac{d(s(x, y))}{255} \left( \frac{1}{Z_{near}} - \frac{1}{Z_{far}} \right) + \frac{1}{Z_{far}} \right)^{-1}$$

In the case of projection of texture picture, s(x,y) is a sample of texture image, and d(s(x,y)) is the depth map value associated with s(x,y).

In the case of projection of depth map values, s(x,y)=d(x,y) and this sample is projected using its own value d(s(x,y))=d(x,y).

The forward view synthesis process may comprise two conceptual steps: forward warping and hole filling. In forward warping, each pixel of the reference image is mapped to a synthesized image. When multiple pixels from a reference frame are mapped to the same sample location in the synthesized view, the pixel associated with a larger depth value (closer to the camera) may be selected in the mapping competition. After warping all pixels, there may be some hole pixels left with no sample values mapped from the reference frame, and these hole pixels may be filled in for example with a line-based directional hole filling, in which a "hole" is defined as consecutive hole pixels in a horizontal line between two non-hole pixels. Hole pixels may be filled by one of the two adjacent non-hole pixels which have a smaller depth sample value (farther from the camera).

In a scheme referred to as a backward view synthesis or backward-projected view synthesis, the depth map co-located with the synthesized view is used in the view synthesis process. View synthesis prediction using such backward view synthesis may be referred to as backward view synthesis prediction or backward-projected view synthesis prediction or B-VSP. To enable backward view synthesis prediction for the coding of the current texture view component, the depth view component of the currently coded/decoded texture view component may be required to be available. In other words, when the coding/decoding order of a depth view component precedes the coding/decoding order of the respective texture view component, backward view synthesis prediction may be used in the coding/decoding of the texture view component. Alternatively or additionally, backward view synthesis may be used if the depth or disparity for the synthesized block is derived, for example using a disparity derivation process. The disparity derivation process need not require the depth view component to precede the respective texture view component in coding/decoding order.

With the B-VSP, texture pixels of a dependent view can be predicted not from a synthesized VSP-frame, but directly from the texture pixels of the base or reference view. Displacement vectors required for this process may be produced from the depth map data of the dependent view, i.e. the depth view component corresponding to the texture view component currently being coded/decoded.

The concept of B-VSP may be explained as follows. Let us assume that the following coding order is utilized: (T0, D0, D1, T1). Texture component T0 is a base view and T1 is dependent view coded/decoded using B-VSP as one prediction tool. Depth map components D0 and D1 are respective depth maps associated with T0 and T1, respectively. In dependent view T1, sample values of currently coded block Cb may be predicted from reference area R(Cb) that consists of sample values of the base view T0. The displacement vector (motion vector) between coded and reference samples may be found as a disparity between T1 and T0 from a depth map value associated with a currently coded texture sample.

The process of conversion of depth (1/Z) representation to disparity may be performed for example with the following equations:

$$Z(Cb(j, i)) = \frac{1}{\frac{d(Cb(j, i))}{255} \cdot \left( \frac{1}{Znear} - \frac{1}{Zfar} \right) + \frac{1}{Zfar}}; \qquad (3)$$

$$D(Cb(j, i)) = \frac{f \cdot b}{Z(Cb(j, i))};$$

where j and i are local spatial coordinates within Cb, d(Cb(j,i)) is a depth map value in depth map image of a view #1, Z is its actual depth value, and D is a disparity to a particular view #0. The parameters f, b, Znear and Zfar are parameters specifying the camera setup; i.e. the used focal length (f), camera separation (b) between view #1 and view #0 and depth range (Znear,Zfar) representing parameters of depth map conversion Free-viewpoint navigation may refer to applications or services where an end-user has the ability to freely navigate around and through the scene which was acquired or captured by a set of cameras. The cameras may but need not form a systematical camera array, such as a parallel 1D camera array. Moreover, the cameras may but need not be located in a manner that suits content generation for stereoscopic or multiview autostereoscopic displays. For example, the cameras may form a sparse set of more than 10 cameras, arbitrarily arranged, with a wider baseline than typically used for stereoscopic video content generation for stereoscopic displays.

Specific end-user equipment may be used for the free-viewpoint navigation application or service. For example, Oculus Rift or similar virtual reality headset may be used. The headset may track head and/or eye movement and display a viewpoint accordingly. The headset may be capable of stereoscopic content viewing. However, free-viewpoint navigation may be realized with conventional end-user equipment too, such as desktop or laptop computers, tablets, or smartphones.

Figure 5:
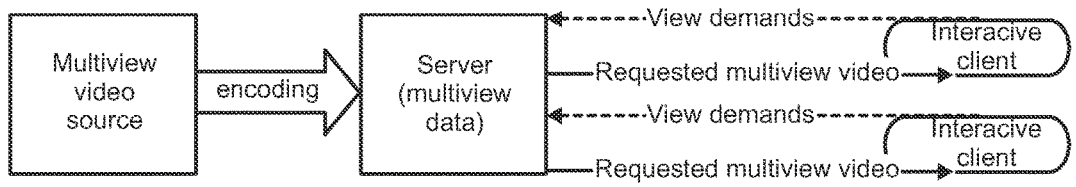
FIG. 5 shows an example of a system for free-viewpoint navigation.

FIG. 5 shows an example of a system for free-viewpoint streaming. Multiview video data are encoded, stored at a server, and provided for the consumption of client devices, which allow users to select interactively which view or views are rendered. Each client requests one or more views from the server depending on the rendering capabilities of its display. For example, one set of clients uses conventional 2D displays, a second set of clients is equipped with stereoscopic displays, while a third set of users can display more than two views at a time on a multiview autostereoscopic display. In order to save transmission bandwidth, the transmitted multiview bitstream is thinned in a manner that it just includes only the requested views and the views required for decoding the requested views. When a user changes viewpoints, the transmitted bitstream is adapted correspondingly.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

In many video communication or transmission systems, transport mechanisms, and multimedia container file formats, there are mechanisms to transmit or store a scalability layer separately from another scalability layer of the same bitstream, e.g. to transmit or store the base layer separately from the enhancement layer(s). It may be considered that layers are stored in or transmitted through separate logical channels. Examples are provided in the following:

ISO Base Media File Format (ISOBMFF, ISO/IEC International Standard 14496-12): Base layer can be stored as a track and each enhancement layer can be stored in another track. Similarly, in a hybrid codec scalability case, a non-HEVC-coded base layer can be stored as a track (e.g. of sample entry type 'avc1', while the enhancement layer(s) can be stored as another track which is linked to the base-layer track using so-called track references.

Real-time Transport Protocol (RTP): an RTP stream can be used to convey one ore more layers, and hence RTP streams of the same RTP session can logically separate different layers.

MPEG-2 transport stream (TS): Each layer can have a different packet identifier (PID) value.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, $2^{nd}$ Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 6:
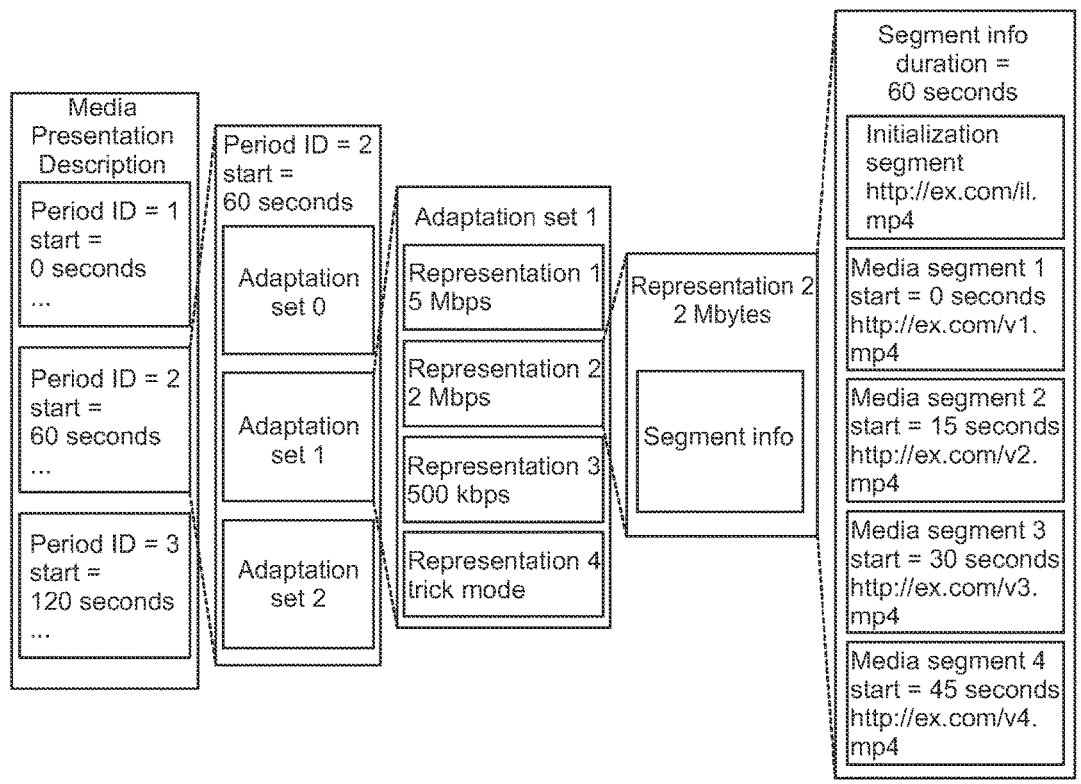
FIG. 6 shows an example of a hierarchical data model used in DASH.

In DASH, hierarchical data model is used to structure media presentation as shown in FIG. 6. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attribute as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camel-casing may be used after the first word, e.g. @veryImportantAttribute. Attributes may have assigned a status in the XML as mandatory (M), optional (O), optional with default value (OD) and conditionally mandatory (CM).

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units.

Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

Segments (or respectively Subsegments) may be defined to be non-overlapping as follows: Let $T_E(S,i)$ be the earliest presentation time of any access unit in stream i of a Segment or Subsegment S, and let $T_L(S,i)$ be the latest presentation time of any access unit in stream i of a Segment or Subsegment S. Two segments (respectively Subsegments), A and B, which may or may not be of different Representations, may be defined to be non-overlapping, when $T_L(A,i) < T_E(B,i)$ for all media streams i in A and B or if $T_L(B,i) < T_E(A,i)$ for all streams i in A and B where i refers to the same media component.

It may be required that for any dependent Representation X that depends on complementary Representation Y, the m-th Subsegment of X and the n-th Subsegment of Y shall be non-overlapping whenever m is not equal to n. It may be required that for dependent Representations the concatenation of the Initialization Segment with the sequence of Subsegments of the dependent Representations, each being preceded by the corresponding Subsegment of each of the complementary Representations in order as provided in the @dependencyId attribute shall represent a conforming Subsegment sequence conforming to the media format as specified in the @mimeType attribute for this dependent Representation.

MPEG-DASH defines segment-container formats for both ISO Base Media File Format and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

DASH specifies different timelines including Media Presentation timeline and Segment availability times. The former indicates the presentation time of access unit with a media content which is mapped to the global common presentation timeline. Media Presentation timeline enables DASH to seamlessly synchronize different media components which is encoded with different coding techniques and shares a common timeline. The latter indicates a wall-clock time and is used to signal clients the availability time of Segments which is identified by HTTP URLs. A DASH client is able to identify an availability time of a certain Segment by comparing the wall-clock time to the Segment availability time assigned to that Segment. Segment availability time plays a key role in live delivery of media Segments, referred as live service. For live service, the Segment availability time is different from Segment to Segment and a certain Segment's availability time depends on the position of the Segment in the Media Presentation timeline. For on-demand service, the Segment availability time is typically the same for all Segments.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may only happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken not to attempt to process such samples.

A content provider may create Segment and Subsegment of multiple Representations in a way that makes switching simpler. In a simple case, each Segment and Subsegment starts with a SAP and the boundaries of Segment and Subsegment are aligned across the Representation of an Adaptation Set. In such a case a DASH client is able to switch Representations without error drift by requesting Segments or Subsegments from an original Representation to a new Representation. In DASH, restrictions to construct Segment and Subsegment are specified in MPD and Segment Index in order to facilitate a DASH client to switch Representations without introducing an error drift. One of the usages of profile specified in DASH is to provide different levels of restrictions to construct Segments and Subsegments.

The DASH standard includes mechanisms to enable fast start-up of a media session. For example, the MPD may announce more than one representation, with different bitrates, in an Adaptation Set. Moreover, each segment and/or subsegment could start with a stream access point, where the pictures within the segment and/or subsegment are coded without referencing to any other picture from a different segment. This way a DASH client may start with a lower bitrate representation in order to increase the buffer occupancy level quickly. Then the client may then switch to requesting segment(s) and/or subsegment(s) of a higher bit rate representation (which may have e.g. a higher spatial resolution than the representation received earlier). The client may target to reach a certain buffer occupancy level, e.g. in terms of media duration, during the fast start-up and may target to keep the same or similar buffer occupancy level during the operation after a fast start-up phase. The client may start media playback after initiating a media streaming session and/or after a random access operation only after a certain amount of media has been buffered. This amount of media may be equal to but need not relate to the buffer occupancy level that is targeted to be reached at fast start-up. In all cases, the fast start-up may enable the client to start the media playback faster than would be possible if only a higher bitrate representation would be consistently received after initiating a media streaming session and/or after a random access operation.

As described above, the client or player may request Segments or Subsegments to be transmitted from different representations similarly to how the transmitted layers and/or sub-layers of a scalable video bitstream may be determined. Terms representation down-switching or bitstream down-switching may refer to requesting or transmitting a lower bitrate representation than what was requested or transmitted (respectively) previously. Terms representation up-switching or bitstream up-switching may refer to requesting or transmitting a higher bitrate representation than what was requested or transmitted (respectively) previously. Terms representation switching or bitstream switching may refer collectively to representation or bitstream up- and down-switching and may also or alternatively cover switching of representations or bitstreams of different viewpoints.

Streaming systems similar to MPEG-DASH include for example HTTP Live Streaming (a.k.a. HLS), specified in the IETF Internet Draft draft-pantos-http-live-streaming-13 (and other versions of the same Internet Draft). As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName= AttributeValue. Hence, tags of HLS M3U8 files may be considered similar to Elements in MPD or XML, and attributes of HLS M3U8 files may be considered similar to Attributes in MPD or XML. Media segments in HLS are formatted according to the MPEG-2 Transport Stream and contain a single MPEG-2 Program. Each media segment is recommended to start with a Program Association Table (PAT) and a Program Map Table (PMT).

As explained above, DASH and other similar streaming systems provide an attractive protocol and/or formats for multimedia streaming applications, especially for multiview coded video bistreams. However, streaming clients typically maintain a relatively large buffer occupancy level in order to avoid playback interruptions due to throughput fluctuations. For viewpoint switching in MVC bitstreams this means that an excessive amount of views is transmitted to the client to enable immediate viewpoint switching.

An atomic unit in streaming ISOBMFF segments over DASH is a self-contained movie fragment, which is typically relatively large. DASH clients typically receive at least one entire self-contained movie fragment before processing it, hence a buffer occupancy level in DASH clients is typically at least one movie fragment.

For example, the quality of experience of free-viewpoint streaming applications may deteriorate significantly if the reaction to viewpoint switch requests is slow. This may be particularly true, when viewpoint switching takes place as response to head and/or gaze tracking.

Consequently, there is a need for a method for performing low-latency viewpoint switching when views are obtained using DASH, but at the same time keep the bitrate of the transmitted video as low as possible and the decoding complexity, in terms of computational and memory requirements, as low as possible.

Now in order to at least alleviate the above problems, a method for initiating a viewpoint switch is presented hereinafter.

Figure 7:
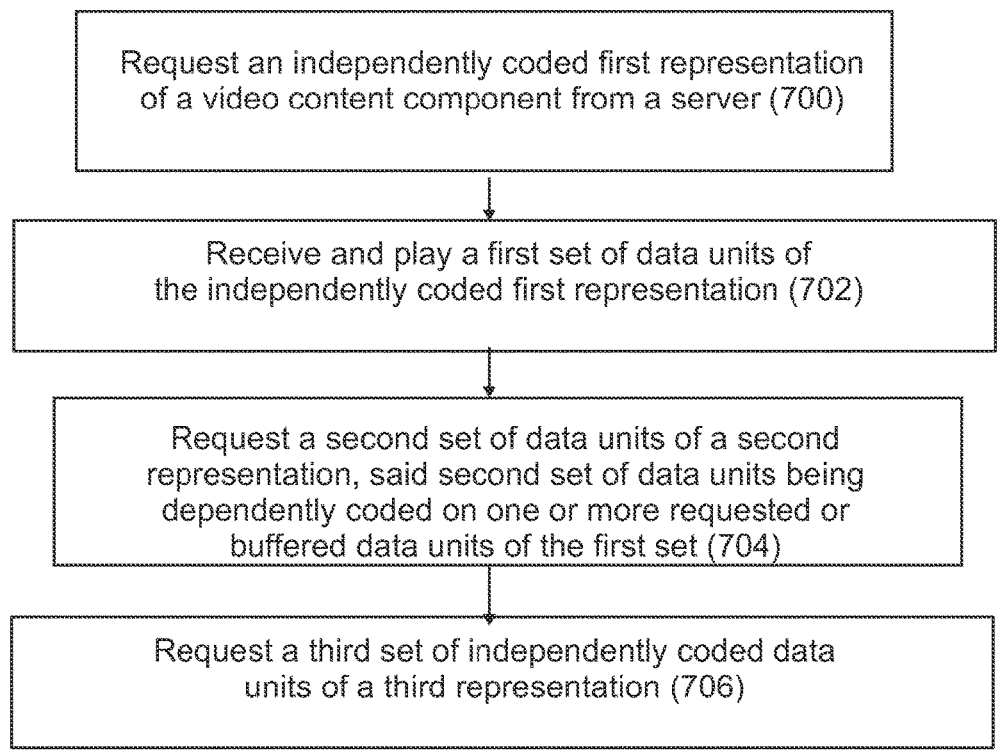
FIG. 7 shows a flow chart of operation of a streaming client according to an embodiment of the invention.

In the view switching method, which is disclosed in FIG. 7, the client requests (700) an independently coded first representation of a video content component from a server; a first set of data units of the independently coded first representation is received and played (702); a second set of data units of a second representation is requested (704), said second set of data units being dependently coded on one or more requested or buffered data units of the first set; and a third set of independently coded data units of a third representation is requested (706).

According to an embodiment, the first set of data units of the independently coded first representation comprises segments or sub-segments of a first view of a multiview coded bitstream and the multiview video content component, and the second set of data units of the second representation comprise segments or sub-segments of a second view of the multiview coded bitstream and the multiview video content component, and the third set of data units of the third representation comprise segments or sub-segments of the second view of the multiview video content component. In other words, the second representation and the third representation represent the same view among multiview video content.

Thus, the client requests segments or sub-segments of the switch-to (second) view for the access units that are already in the client buffer or for which the data of the switch-from (first) view have already been requested. Compared to requesting single-layer switch-to segments, higher coding efficiency is achieved because the switch-from view segments have already been downloaded and if for example inter-view-prediction is applied, the segments or sub-segments of the switch-to (second) view can be made smaller in size compared to independently coded switch-to representation.

Figure 8:
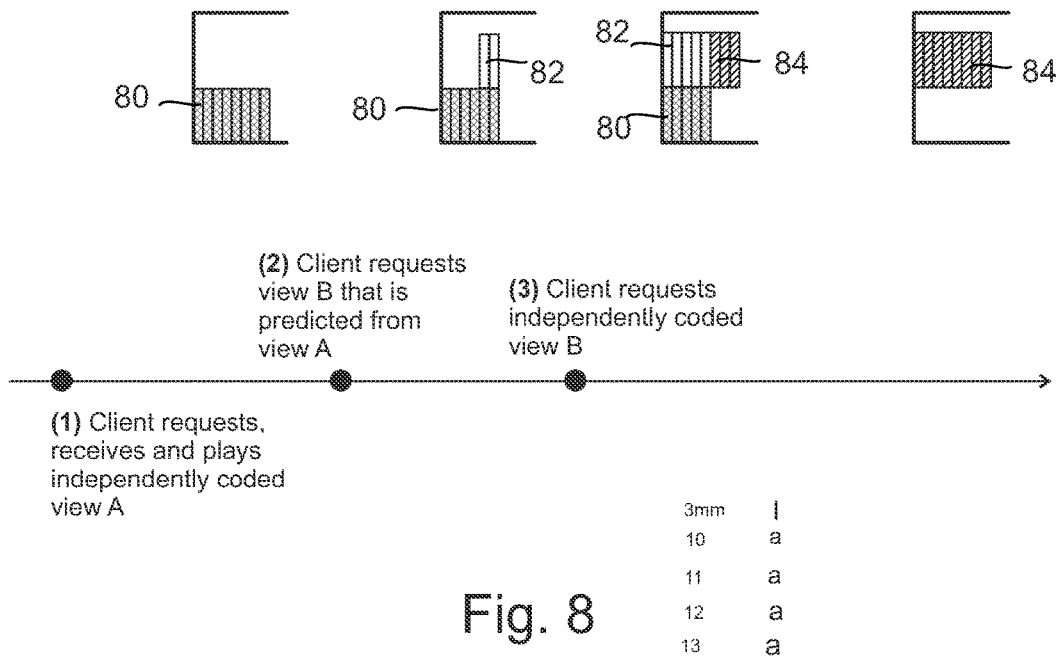
FIG. 8 shows an example operation of the client according to an embodiment of the invention.

The embodiment can be further illustrated by an example disclosed in FIG. 8, where the client first requests, receives and plays an independently coded view A (80; first view). When the user of the client initiates a view switch, the client requests from the server one or more segments or sub-segments of an inter-view-predicted representation (82; lighter boxes on the upper layer in FIG. 8) of the switch-to view (second view B in the example) for the remaining of the currently buffered segments or sub-segments (80; dark boxes on the lower layer in FIG. 8) of the first view A. It is also possible that the inter-view coded representation of second view B may also be requested for the already requested (but not yet buffered) segments or sub-segments of first view A. This avoids terminating the already sent requests, which may require terminating TCP connections, which in turn causes delay in re-establishing TCP connections for any subsequent requests. The client then requests independently coded segments or sub-segments (84; dark boxes on the upper layer in FIG. 8) of the second view B.

Thus, only the displayed views are transmitted, and viewpoint switching happens retroactively, i.e. data for new views is obtained for the time period that has already been received and buffered, which decreases the latency of viewpoint switching and avoids playback interruptions. The above embodiment is superior e.g. compared to the situation where each view is available only as an independently coded representation. In such a situation, the DASH client may request the new view starting from a media time that immediately follows the media time represented by the already buffered or already requested of the current (switch-from) view. This may cause a significant latency between the user's initiation of the view switch and the first picture of the switch-to view being displayed. Alternatively, the DASH client may request the new view from the current playback position and interrupt the media playback until sufficient amount of data of the new view (for continuous playout) have been received. Alternatively, the DASH client may request the new view, typically first at a lower bit rate to enable fast start-up, from a position between the current playback position and the playback position that immediately follows the media time represented by the already buffered or already requested of the current (switch-from) view. This approach, however, causes omission of some of the received data of the switch-from view and fluctuation of the video quality, as a lower bit rate may be used for fast start-up.

According to an embodiment, a first segment or sub-segment of the second set of data units may be determined such that it corresponds to a segment or a sub-segment of the first set of data units already downloaded and stored in a buffer or estimated to be downloaded and stored in the buffer by the time said first segment or sub-segment of the second set of data units is received. The determination which inter-view-predicted switch-to view segments or sub-segments are downloaded may be based, for example, on buffer occupancy and/or estimated download bandwidth.

According to an embodiment, a first segment or sub-segment of the second set of data units may be determined such that it corresponds to an intra random access point (IRAP) picture in the second set of data units. A layer-wise start-up mechanism may be in use for the decoding of the second set of data units. Pictures prior to said IRAP picture, in decoding order, may be determined to be such that are not decoded (e.g. CL-RAS pictures) or are decoded with reference to generated unavailable pictures but not output or displayed. RASL pictures or alike that are associated with said IRAP picture may be either ignored (i.e. not decoded) or may be decoded but not output or displayed. All pictures of the second set of data units other than the CL-RAS picture and the associated RASL pictures of said IRAP picture may be decoded and output/displayed.

In an embodiment, which may be applied together with or independently of other embodiments, the third representation may be indicated, in the MPD, to be equivalent to the second representation in terms of the represented view, picture quality, spatial resolution, bit-depth, color gamut and/or dynamic range. Additionally or alternatively, the second representation may be indicated, in the MPD, to be equivalent to the third representation. For example, a SupplementalProperty descriptor may be specified for indicating said equivalency. The @schemeIdUri attribute of the descriptor element provides a URI that identifies the scheme of specifying equivalent representations. The @value attribute of the descriptor element may be used to provide a list of representation identifier values (i.e., Representation@id values) of equivalent representations in terms of the represented view, picture quality, spatial resolution, bit-depth, color gamut and/or dynamic range. In some cases, the URI may indicate and/or the @value may include which one(s) of the represented view, picture quality, spatial resolution, bit-depth, color gamut and/or dynamic range may be considered equivalent.

In an embodiment, which may be applied together with or independently of other embodiments, the third representation may be parsed, from the MPD, to be equivalent to the second representation in terms of the represented view, picture quality, spatial resolution, bit-depth, color gamut and/or dynamic range. Additionally or alternatively, the second representation may be parsed, from the MPD, to be equivalent to the third representation. For example, a SupplementalProperty descriptor indicating said equivalency may be parsed from the MPD. For example, the @value attribute of the descriptor element may be used to obtain a list of representation identifier values (i.e., Representation@id values) of equivalent representations in terms of the represented view, picture quality, spatial resolution, bit-depth, color gamut and/or dynamic range. In another example, it may be determined from a fact that the second and third representations are parts of the same Adaptation Set that they represent the same view and hence are equivalent in terms of the represented view. It may further be obtained, e.g. from the @dependencyId, that the second representation is a dependent representation of the first representation (i.e. the first representation is a complementary representation of the second representation). Based on determining that the second and third representations are equivalent and that the second representation is a dependent representation of the first representation, a DASH client may determine that embodiments based on the method described with FIG. 7 is applied e.g. for view switching or fast start-up.

According to an embodiment, the segments or sub-segments of the independently coded second view may be requested following, in playout time, the segments or sub-segments of the second set of data units. Thus, the playback of the segments or sub-segments of the independently coded second view (e.g. the dark boxes on the upper layer in FIG. 8) is started immediately after the playback of segments or sub-segments of an inter-view-predicted representation (e.g. the lighter boxes on the upper layer in FIG. 8) of the second view.

According to an embodiment, the client may continue to request the segments or sub-segments of the first and the second sets of data units; i.e. the client may continue to request (sub-)segments of the switch-from view and the inter-view-predicted switch-to view. This may allow better network adaptation but may introduce a slight coding efficiency loss.

According to an embodiment, the client may request said second set of data units from the server as an inter-view predicted view predicted from said first set of data units.

According to an alternative embodiment, the client may request said second set of data units from the server as a depth view for said first set of data units; and apply depth-image-based rendering (DIBR) or forward view synthesis for generating the second representation.

According to an embodiment, both texture and depth of the switch-from view are requested prior to the initiation of the viewpoint switch. As response to a viewpoint switch, the client may use DIBR or forward view synthesis to generate a desired switch-to viewpoint for pictures that are displayed next (i.e. virtually immediately). In addition, the client may request inter-view-predicted switch-to view and also otherwise operate as described in other embodiments.

According to an embodiment, the client may, in addition to obtaining a depth switch-from view, obtain a switch-to view, which may be inter-view-predicted and/or view-synthesis-predicted using the texture and depth switch-from views.

According to an embodiment, instead of requesting/transmitting an inter-view-predicted switch-to view, a depth view for the switch-to view may be requested/transmitted. Backward view synthesis may be used in the client to generate a desired switch-to viewpoint.

According to an embodiment, the client may, in addition to obtaining a depth switch-to view, obtain a switch-to view, which may be inter-view-predicted and/or view-synthesis-predicted using the texture switch-from view, where the view synthesis prediction may use the depth switch-to view for backward view synthesis.

According to an embodiment, the desired viewpoint does not match any view that is available in the server. The client may obtain one or more texture and depth views according to an embodiment described above. Additionally, the client may use DIBR or forward view synthesis to generate the desired viewpoint.

Embodiments have been described with the assumption that one view is displayed at any point of time. It needs to be understood that embodiments can similarly be realized when more than one view is displayed, e.g. on a stereoscopic display or a multiview autostereoscopic display.

Regarding different embodiments for arranging the inter-view-predicted representation, for example following options may be applied:

The quality of the inter-view-predicted switch-to view may be lower than that of the switch-from view. For example, a higher quantization parameter may be used in the inter-view-predicted switch-to view than in the switch-from view. Alternatively or additionally, the inter-view-predicted switch-to view may have lower spatial resolution than the switch-from view. The motivation for providing the inter-view-predicted switch-to view at a lower quality is to keep its bitrate as small as possible, which helps in avoiding buffer draining in clients, in avoiding exceeding the throughput of the channel, and/or keeping the required storage space in the server and/or in proxy server(s) low.

The server may hold several inter-view coded representations for the same pair of switch-from and switch-to views, differentiated based on which points are potential switch points (i.e. contain random access point pictures or such). When the same segment duration is used for an independently coded switch-to view and the inter-view-predicted switch-to representations, the number of inter-view-predicted representations may, for example, be proportional to the number of GOPs in a segment (where a GOP is a periodic prediction structure, not necessarily starting with an IRAP picture or such). For example, if GOP length is equal to 8 and picture rate is 25 Hz, an approximately 2-second segment is obtained when a segment contains 6 GOPs. Six inter-view-predicted representations for the same pair of switch-from and switch-to views could be maintained, containing an IRAP picture or such at the start of the n-th GOP where n is from 1 to 6. (No inter prediction is applied for the IRAP picture, while inter-view-prediction may be used.) Inter- and inter-view-predicted pictures may be used for other GOP key pictures.

A shorter segment duration may be used for inter-view-predicted switch-to representations than for the independently coded representations. Each segment of an inter-view-predicted switch-to representation may start with a random access point. MPD signaling for indicating that an integer multiple of segments of the inter-view-predicted switch-to representation exactly matches an integer number of segments of independently coded representations. For example, an attribute "@segAlignment" may be added to the Representation element. When @segAlingment is a positive integer value, the following applies. Let segDur1 be the value of @segAlignment of a first Representation in an Adaptation Set and segDur2 be the value of @segAlignment of a second Representation of the same Adaptation Set. Let segPer be equal to segDur1*segDur2. Let the 0th Super-Segment of the first Representation consist of the segDur2 Segments starting from the beginning of the Period, the 1st Super-Segment of the first Representation consist of the next segDur2 Segments after the 0th Super-Segment, and so on. Let the 0th Super-Segment of the first Representation consist of the segDur1 Segments starting from the beginning of the Period, the 1st Super-Segment of the first Representation consist of the next segDur1 Segments after the 0th Super-Segment, and so on. The n-th Super-Segment of the first Representation and the m-th Super-Segment of the second Representation are non-overlapping when m is not equal to n.

A shorter Sub-Segment duration may be used for inter-view-predicted switch-to representations than for the independently coded representations. Each sub-segment of an inter-view-predicted switch-to representation may start with a random access point. MPD signalling for indicating that an integer multiple of sub-segments of the inter-view-predicted switch-to representation exactly matches an integer number of sub-segments of independently coded representations.

As it is possible that the user initiates a second or further view switch in a short time, more than one view may be coded in an inter-view-predicted representation and so-called levels, e.g. as announced through the Level Assignment box described earlier, may be used to arrange coded data in the segments and/or subsegments in view prediction order. A DASH client may use information on the levels, e.g. as parsed from one or more Subsegment Index boxes, to determine byte ranges within a segment or a subsegment corresponding to the levels corresponding to the desired views. A DASH client can use HTTP GET byte range requests to obtain only those levels (i.e. views) of the segment or subsegment that the user wants to receive.

In the above, the method of FIG. 7 and the embodiments related thereto have been described in connection with view switching. However, the method of FIG. 7 may also be used for streaming clients (and specifically DASH clients) to improve the fast start-up of streaming session and better adaptation to changing network conditions.

In video streaming applications, the start-up time (the time it takes for the video to start playing after the user initiated the session, for example by clicking a play button) is an important issue and directly affects the user experience. If the users need to wait a long time for buffering before the play back starts, the experience is badly affected even if the video quality is good. In addition to reduced start-up time, the video streaming system should be able to react quickly to changing network conditions. For example, if the network conditions improve, it would be desirable for the video streaming system to quickly increase the resolution and/or quality of the streamed video content.

When considering the method of FIG. 7 and its applicability to a fast start-up of streaming session, let us consider that same content is offered in at least the following coded versions:

A lower-bitrate single-layer stream. In the context of DASH, the lower-bitrate single-layer stream may be a first Representation, and in the context of FIG. 7 "an independently coded first representation".
  A higher-bitrate single-layer stream. This may for example represent a higher spatial resolution than the lower-bitrate version. In the context of DASH, the higher-bitrate single-layer stream may be a second Representation which may be in the same Adaptation Set as the first Representation. In the context of FIG. 7 this may refer to "a third representation".
  An enhancement scalability layer for the lower-bitrate stream. This may represent similar quality and/or spatial resolution and/or other characteristics as the higher-bitrate single-layer stream. In the context of DASH, this enhancement scalability layer may be a Dependent Representation for the first Representation, and the Dependent Representation may also be in the same Adaptation Set as the first and second Representations. In the context of FIG. 7 this may refer to "a second set of data units of a second representation being dependently coded on data units of the first set".

The client may request in its "steady mode" the single-layer streams depending on the estimated throughput. Consider a DASH streaming session and the DASH client decides to switch to a higher resolution. This could happen for different reasons. For example the download speed of the video might have increased which results in a gradual increase in the buffer occupancy of the client. Upon detection of the increase in available bandwidth, the client could decide to download the higher resolution segments. Alternatively, the user could notice the download progress and decide to switch to a higher resolution.

According to an embodiment, during start-up and/or other occasions of Representation up-switching (to a higher bitrate), the client determines to request a limited period of the Dependent Representation in order to switch faster to a higher quality and/or resolution and/or bit-depth and/or dynamic range and/or broader color gamut and hence provide an improved user experience.

Figure 9:
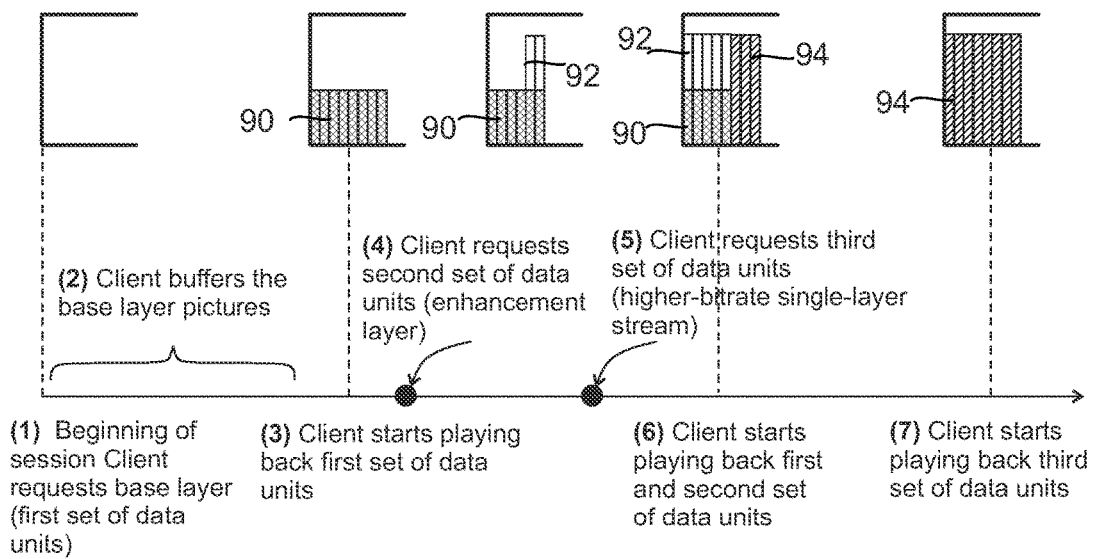
FIG. 9 shows another example operation of the client according to an embodiment of the invention.

The operation of the client may be illustrated by an example disclosed in FIG. 9. While FIG. 9 is described with reference to representations of different quality or spatial resolution, it needs to be understood that the example can be applied additionally or alternatively to any other type of scalability such as bit-depth, dynamic range, and/or color gamut scalability. In the example, the client requests (1) a first set of data units containing coded video of an independent scalability layer (of a first Representation). The client buffers (2) the received first set of data units. The client starts to decode and/or play (3) the received first set of data units (90; dark boxes on the first layer in FIG. 9). Prior to decoding and/or playing all of the received first set of data units, the client requests (4) a second set of data units containing coded video of a scalability layer dependent on the independent scalability layer (92; lighter boxes on the second layer in FIG. 9). The second set of data units corresponding to a subset of the first set of data units that have not been decoded and/or played. The client requests (5) a third set of data units containing coded video of a second independent scalability layer (of a second Representation) (94; dark boxes covering the first and the second layer in FIG. 9), the third set of data units representing a continuation of the same video content as the second set of data units, the third set of data units representing similar video quality and/or characteristics as the second set of data units, and the third set of data units succeeding in playback the second set of data units. The client starts to decode and play (6) the received second set of data units, in addition to corresponding first set of data units that second set of data units depend upon. When all the data units of the second set have been decoded and played, the client starts to decode and play (7) the received third set of data units (second independent scalability layer). It should be noted that the order of steps 5 and 6 may differ.

Again, the client may start requesting the higher resolution enhancement layer segments for the pictures already in the buffer and switch to higher resolution. Compared to requesting single layer high resolution segments, a higher coding efficiency is achieved because as base layer segments are already downloaded, and the additional bitrate needed is small. The client may proceed with high resolution single layer bitstream at the next SAP, or could proceed downloading the base and enhancement layer segments.

This operation can be summarized as follows:
 i. Request base layer segments till a decision to switch to higher resolution/quality version of the video
 ii. Based on the buffer occupancy of base layer and the estimated download bandwidth, determine the enhancement layer segments starting from position M to be downloaded. The first enhancement layer segment M shall correspond to a base layer segment already downloaded and stored in the base layer buffer or estimated to be downloaded and stored in the base layer buffer by the time the first enhancement layer segment M is received.
 iii. Estimate in the client that at the time decoding/playback reaches M, single layer segments of high resolution/quality M+L is being requested.
 iv. For the segments between M and L, decoding/display base and enhancement layer segments.
 v. For the segments after L, decode/display high quality/resolution single layer segments.

As an alternative to iii., where single layer segments of high resolution/quality M+L are being requested, the client may continue to request base and enhancement layer segments. This would allow better network adaptation but would slightly introduce coding efficiency loss.

For ii., the enhancement layer segment starting from position M can be calculated so that position M corresponds to a base layer IRAP picture, enhancement layer IRAP picture or both.

Herein, the enhancement layer segments may be requested on a separate TCP connection.

Similar idea may also be used for fast start-up as follows. More specifically, at the beginning of the streaming session, the enhancement layer segments could be downloaded in advance of base layer segments so that enhancement layer buffer is gradually built up before starting to decode it. This is done as follows:

i. During the initial period where buffers are filled up before playback starts, client starts requesting base layer segments (starting from segment 0) and enhancement layer segments (starting from segment M).
 ii. When base layer buffer fullness reaches a threshold level, start decoding and displaying base layer segments till position M.
 iii. At the time the decoding/playback reaches segment M, the base layer segments M+L and enhancement layer segment M+L are being requested (approximately at the same time).
 iv. At the time the decoding/playback reaches segment M, start decoding/playback base and enhancement layer segments.

Again, the enhancement layer segments may be requested on a separate TCP connection.

For i., the enhancement layer segment starting from position M can be calculated so that position M corresponds to a base layer IRAP picture, enhancement layer IRAP picture or both.

Regarding the options for transmission connections and protocols, the embodiments may be realized with various protocols enabling to request segments or sub-segments, including but not limited to different versions of HTTP, such as HTTP/1.1 and HTTP/2.0, WebSockets, and SPDY.

The embodiments may be realized with various configurations to establish and use TCP connections, including but not limited to the following.

As discussed above a separate TCP connection may be used for downloading the enhancement layer segments. In the case that bandwidth rapidly decreases and there appears a danger of a pause in playback, this enables easier and faster termination of the reception of the enhancement layer segments.

Alternatively or additionally, the same TCP connection may be used for base-layer and enhancement-layer segments. In that case, the HTTP GET requests may be pipelined. The client may select the order of HTTP GET requests in a manner that a greater duration of base-layer segments gets buffers in the client (compared to the buffered duration of enhancement-layer segments). The client may also determine the duration of enhancement layer segments or sub-segments to be smaller than that of the base-layer segments or sub-segments in order to be able to react more quickly in throughput changes.

Embodiments may be realized with various types of access links and link layer protocols and their configurations for access links. For example, if QoS specified by 3GPP is in use, the TCP connection for enhancement layer segments could run on a best-effort QoS while the base layer segments could have a guaranteed QoS channel.

Figure 10:
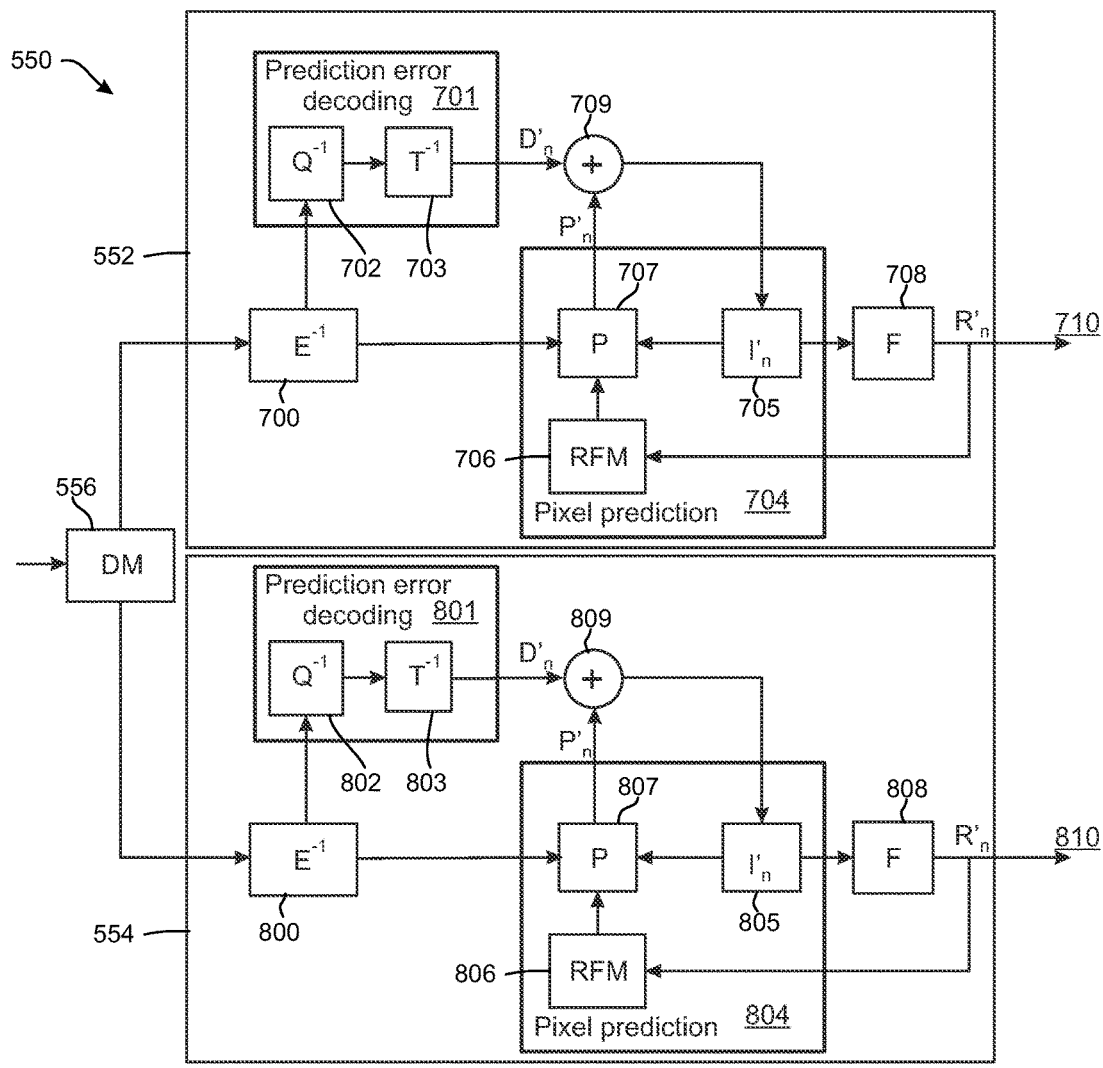
FIG. 10 shows a schematic diagram of a decoder suitable for implementing embodiments of the invention.

FIG. 10 shows a block diagram of a video decoder suitable for employing embodiments of the invention. FIG. 10 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

Herein, the decoder should be interpreted to cover any operational unit capable to carry out the decoding operations, such as a player, a receiver, a gateway, a demultiplexer and/or a decoder.

Figure 11:
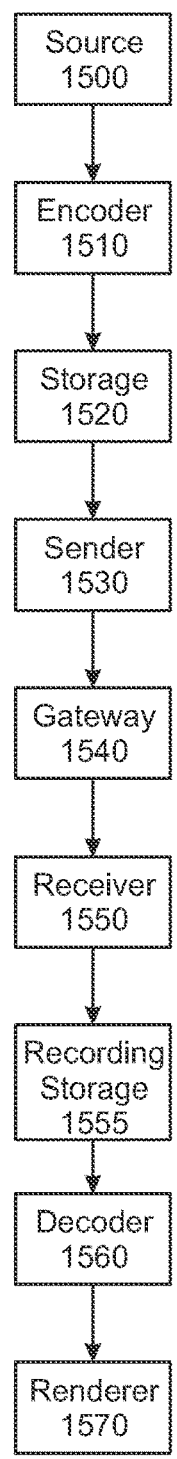
FIG. 11 shows a schematic diagram of an example multimedia communication system within which various embodiments may be implemented.

FIG. 11 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 1540 may or may not be connected to a gateway 1550 through a communication network. The gateway may also or alternatively be referred to as a middle-box. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1550 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes or other devices that forward broadcast transmissions locally to home wireless networks. When RTP is used, the gateway 1550 may be called an RTP mixer or an RTP translator and may act as an endpoint of an RTP connection. Instead of or in addition to the gateway 1550, the system may include a splicer which concatenates video sequence or bitstreams.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 580 is multi-tasking and uses computing resources for other purposes than decoding the scalable video bitstream. In another example, faster decoding operation might be needed when content is played back at a faster pace than the normal playback speed, e.g. twice or three times faster than conventional real-time playback rate. The speed of decoder operation may be changed during the decoding or playback for example as response to changing from a fast-forward play from normal playback rate or vice versa, and consequently multiple layer up-switching and layer down-switching operations may take place in various orders.

In the above, example embodiments have been described in the context of multi-layer HEVC extensions, such as SHVC and MV-HEVC. It needs to be understood that embodiments could be similarly realized in any other multi-layer coding scenario.

In the above, some embodiments have been described in relation to DASH or MPEG-DASH. It needs to be understood that embodiments could be similarly realized with any other similar streaming system, and/or any similar protocols as those used in DASH, and/or any similar segment and/or manifest formats as those used in DASH, and/or any similar client operation as that of a DASH client.

In the above, some embodiments have been described in relation to ISOBMFF, e.g. when it comes to segment format. It needs to be understood that embodiments could be similarly realized with any other file format, such as Matroska, with similar capability and/or structures as those in ISOBMFF.

In the above, some embodiments have been described in relation to FIG. 9 or FIG. 10. It needs to be understood that embodiments described in relation to FIG. 9 can be similarly realized as embodiments in relation to FIG. 10. Likewise, it needs to be understood that embodiments described in relation to FIG. 10 can be similarly realized as embodiments in relation to FIG. 9. Moreover, embodiments described in relation to FIG. 9 may be combined with embodiments in relation to FIG. 10.

In the above, some embodiments have been described in relation to the term view. It needs to be understood that embodiments can similarly be realized in relation to the term layer. Vice versa, in the above, some embodiments have been described in relation to the term layer, and it needs to be understood that embodiments can similarly be realized in relation to the term view.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   requesting, by a client, an independently coded first representation of a video content component from a server;
   receiving and playing a first set of data units of the independently coded first representation;
   requesting, by the client, a second set of data units of a second representation, the second set of data units being dependently coded on one or more requested or buffered data units of the first set;
   requesting, by the client, a third set of independently coded data units of a third representation; and
   parsing, by the client, the third representation to be equivalent to the second representation in terms of a represented view, a picture quality, and a spatial resolution.

2. The method according to claim 1, wherein the first set of data units comprises segments or sub-segments of a first view of a multiview coded bitstream, and the second and the third sets of data units comprise segments or sub-segments of a second view of the multiview coded bitstream.

3. The method according to claim 2, further comprising:
   determining a first segment or sub-segment of the second set of data units such that it corresponds to a segment or a sub-segment of the first set of data units already received or estimated to be received by the time said first segment or sub-segment of the second set of data units is received.

4. The method according to claim 2, further comprising:
   determining the first segment or sub-segment of the second set of data units such that it corresponds to an intra random access point picture in the second set of data units.

5. The method according to claim 2, further comprising:
   requesting the segments or sub-segments of the third representation following, in playout time, the segments or sub-segments of the second set of data units.

6. The method according to claim 2, further comprising:
   continuing to request the segments or sub-segments of the first and the second representations.

7. The method according to claim 2, further comprising:
requesting said second set of data units as an inter-view predicted view predicted from said first set of data units.

8. The method according to claim 2, further comprising:
requesting said second set of data units as a depth view for said first set of data units; and
applying depth-image-based rendering or forward view synthesis for generating the second representation.

9. The method according to claim 1, wherein the first representation comprises a lower-bitrate single-layer stream of the video content component, the second representation comprises an enhancement scalability layer for the lower-bitrate stream of the video content component and the third representation comprises a higher-bitrate single-layer stream of the video content component.

10. The method according to claim 9, further comprising:
requesting said second set of data units of the second representation as a response to receiving a user request or the client determining to switch to a higher resolution representation of the video content component.

11. An apparatus of a client comprising at least one processor and at least one memory including computer program code, the at least one memory and the computer program code configured to, with the at least one processor, cause the apparatus to:
request, by the client, an independently coded first representation of a video content component from a server;
receive and play a first set of data units of the independently coded first representation;
request, by the client, a second set of data units of a second representation, the second set of data units being dependently coded on one or more requested or buffered data units of the first set;
request, by the client, a third set of independently coded data units of a third representation; and
parse the third representation to be equivalent to the second representation in terms of a represented view, a picture quality, and a spatial resolution.

12. The apparatus according to claim 11, wherein the first set of data units comprises segments or sub-segments of a first view of a multiview coded bitstream, and the second and the third sets of data units comprise segments or sub-segments of a second view of the multiview coded bitstream.

13. The apparatus according to claim 12, the at least one memory and the computer program code further configured to, with the at least one processor, cause the apparatus to:
determine a first segment or sub-segment of the second set of data units such that it corresponds to a segment or a sub-segment of the first set of data units already received or estimated to be received by the time said first segment or sub-segment of the second set of data units is received.

14. The apparatus according to claim 12, the at least one memory and the computer program code further configured to, with the at least one processor, cause the apparatus to:
determine the first segment or sub-segment of the second set of data units such that it corresponds to an intra random access point (IRAP) picture in the second set of data units.

15. The apparatus according to claim 12, the at least one memory and the computer program code further configured to, with the at least one processor, cause the apparatus to:
request the segments or sub-segments of the third representation following, in playout time, the segments or sub-segments of the second set of data units.

16. The apparatus according to claim 12, the at least one memory and the computer program code further configured to, with the at least one processor, cause the apparatus to:
continue to request the segments or sub-segments of the first and the second representations.

17. The apparatus according to claim 12, the at least one memory and the computer program code further configured to, with the at least one processor, cause the apparatus to:
request said second set of data units as an inter-view predicted view predicted from said first set of data units.

18. The apparatus according to claim 12, the at least one memory and the computer program code further configured to, with the at least one processor, cause the apparatus to:
request said second set of data units as a depth view for said first set of data units; and apply depth-image-based rendering or forward view synthesis for generating the second representation.

19. The apparatus according to claim 11, wherein the first representation comprises a lower-bitrate single-layer stream of the video content component, the second representation comprises an enhancement scalability layer for the lower-bitrate stream of the video content component and the third representation comprises a higher-bitrate single-layer stream of the video content component.

20. The apparatus according to claim 19, the at least one memory and the computer program code further configured to, with the at least one processor, cause the apparatus to:
request said second set of data units of the second representation as a response to receiving a user request or the apparatus determining to switch to a higher resolution representation of the video content component.

21. A method comprising:
requesting, by a client, an independently coded first representation of a video content component from a server;
receiving and playing a first set of data units of the independently coded first representation;
requesting, by the client, a second set of data units of a second representation, the second set of data units being dependently coded on one or more requested or buffered data units of the first set;
requesting, by the client, a third set of independently coded data units of a third representation; and either
parsing, by the client, the second representation to be equivalent to the third representation in terms of a represented view, a picture quality, and a spatial resolution; or
parsing, by the client, the third representation to be equivalent to the second representation in terms of the represented view, the picture quality, and the spatial resolution.

22. The method according to claim 21, wherein the first set of data units comprises segments or sub-segments of a first view of a multiview coded bitstream, and the second and the third sets of data units comprise segments or sub-segments of a second view of the multiview coded bitstream, the method further comprising at least one of:
determining a first segment or sub-segment of the second set of data units such that it corresponds to a segment or a sub-segment of the first set of data units already received or estimated to be received by the time the first segment or sub-segment of the second set of data units is received;

determining the first segment or sub-segment of the second set of data units such that it corresponds to an intra random access point picture in the second set of data units;
requesting the segments or sub-segments of the third representation following, in playout time, the segments or sub-segments of the second set of data units;
continuing to request the segments or sub-segments of the first and the second representations;
requesting the second set of data units as an inter-view predicted view predicted from the first set of data units;
requesting the second set of data units as a depth view for the first set of data units; and
applying depth-image-based rendering or forward view synthesis for generating the second representation.

23. The method according to claim 21, wherein the first representation comprises a lower-bitrate single-layer stream of the video content component, the second representation comprises an enhancement scalability layer for the lower-bitrate stream of the video content component, and the third representation comprises a higher-bitrate single-layer stream of the video content component.

24. The method according to claim 23, further comprising:
requesting said second set of data units of the second representation as a response to receiving a user request or the client determining to switch to a higher resolution representation of the video content component.

* * * * *